United States Patent [19]

Phillips

[11] Patent Number: 4,843,979
[45] Date of Patent: Jul. 4, 1989

[54] INCINERATION SYSTEM FOR THE DESTRUCTION OF HAZARDOUS WASTES

[75] Inventor: Patrick A. Phillips, Lauderdale, Fla.

[73] Assignee: Vesta Technology, Ltd., Ft. Lauderdale, Fla.

[21] Appl. No.: 72,869

[22] Filed: Jul. 14, 1987

[51] Int. Cl.$^4$ .............................................. F23J 15/00
[52] U.S. Cl. ..................... 110/215; 110/203; 110/235; 110/341; 110/345; 110/346; 422/178
[58] Field of Search ................. 126/113; 110/210, 216, 110/235, 236, 237, 243, 255, 259, 215, 213, 341, 345, 346; 55/244; 422/178

[56] References Cited

U.S. PATENT DOCUMENTS

| 773,920 | 11/1904 | Boulger ............................ 110/210 |
| 4,547,351 | 10/1985 | Im et al. ...................... 110/203 X |
| 4,718,357 | 1/1988 | Wang et al. .................. 110/215 X |

Primary Examiner—Larry Jones

[57] ABSTRACT

A process and apparatus for the controlled incineration of hazardous wastes comprising a two stage combustion of the waste into gases. The gases are thereafter cooled and cleaned by passing through primary and secondary scrubbers for cleaning. The invention also concerns an apparatus for the incineration of hazardous waste. The system cleans the gases produced by the incineration process so that hazardous materials are completely incinerated and converted into environmentally safe products at the site of their production.

31 Claims, 1 Drawing Sheet

INCINERATION SYSTEM FOR THE DESTRUCTION OF HAZARDOUS WASTES

The present invention relates generally to the treatment of potentially hazardous waste materials, and more particularly to an improved process and apparatus for incinerating such materials.

BACKGROUND OF THE INVENTION

Prior to the present awareness of the hazardous nature of numerous waste materials, these materials were typically either dumped or were allowed to enter the ecosystem in other ways. Examples of such practices were the widespread dumping of wastes containing chlorinated hydrocarbons onto land or the release of toxic heavy metals, such as those produced in metal plating or metal finishing industries, into sewerage systems and hence to the sludges produced from sewage treatment or land farming. Such materials can and have entered the human food chain either through leaching by rain of the hazardous material into the underground water table or from food grown on land that has been contaminated by these substances.

Numerous attempts have been made to address such environmental problems. In the past, heavily contaminated soil or sludge was often transported to a site remote from population centers or from sources of drinking water. The contaminated soil or sludge was then deposited into "safe" landfills after fixation.

An attractive technical approach to the problem of disposing of hazardous waste material is offered by incineration which facilitates the conversion of chlorinated hydrocarbons into less hazardous by-products such as carbon dioxide and hydrogen chloride, or heavy metals into environmentally safe oxides. For this method to be successful, however, two requirements must be met. First, the incineration must be complete since partial oxidation of chlorinated hydrocarbons may result in the production of compounds that are more harmful than the original material. These harmful compounds may be either in the form of exhaust gases or residual ashes, or both. Second, all harmful combustion products must be removed completely from the gas stream produced by the incineration and thereafter rendered harmless.

Thus far, incineration processes have not met these two essential requirements. One problem is presented by the complexity and sensitivity of the control system required for effecting a complete combustion. Another obstacle has been the size and cost of incinerators capable of eliminating industrial quantities of waste. The size and cost of adequate scrubbing systems for cleaning the resulting gases are similarly daunting. Moreover, the cost efficiency of existing incineration systems is significantly reduced by the need for mechanical stirring or vibration within the scrubbing systems. Another formidable limitation is the opposition by the public toward both the location of such an incinerator in their vicinity and the transportation of hazardous wastes thereto.

As a result, incineration plants have generally been very large, costly, and, by necessity, stationary. Consequently, large quantities of hazardous waste materials have had to be carted from the waste-producing location over long distances on public roads with an obvious concomitant risk to the environment. In addition, the resistance by neighborhoods to the siting of such incinerating plants in their localities has grown to such a level as to inhibit the construction and use of this possibly beneficial technology.

It is accordingly an object of this invention to provide a process for the complete incineration of hazardous waste into environmentally safe exhaust gases and residual ash.

It is another object of this invention to provide such a process wherein all harmful combustion by-products are removed from the gas stream produced by the incineration process and thereafter rendered harmless.

It is another object of this invention to provide such a process wherein harmful particulate matter is removed from the gas stream by passing the gas stream through a scrubber chamber without the need for mechanical vibration or stirring.

It is another object of this invention to provide an industrial scale incinerator system which is mobile or transportable to a desired location.

Still another object of this invention is to provide an incineration system which permits hazardous wastes to be treated at the site of their production, thus eliminating the need for costly and dangerous transportation of such materials.

SUMMARY OF THE INVENTION

The present invention is directed to an incineration system for the destruction of hazardous waste. In accordance with the broad aspects of the present invention, waste in the form of solid, liquid or sludge is introduced into and incinerated in a first combustion chamber to produce ash, particulate solids and vaporous materials. The ash by-products are discarded from the first combustion chamber and the remaining particulate solids and vaporous materials are introduced into and incinerated in a second combustion chamber to produce off-gases. Generally, the source of oxygen in the first and second combustion chambers is air.

The off-gases are removed from the second chamber and are passed over cold water circulating coils so as to lower the temperature of the off-gases to at least 1000° F. to enable filtering of particulates of solid residue therefrom. After being subjected to an atomized water spray, the cooled gases are passed through a water bath and are then released into a primary scrubber chamber. Advantageously, the cooled gases are introduced into the primary scrubber without the need for mechanical vibration or stirring by deflecting the cooled gases down a Venturi tube into the water bath. The gases released from the primary scrubber are subsequently passed through a secondary scrubber chamber to remove any aerosol bubbles and to remove any residual contaminants. Cleaned gases are exhausted after treatment in the secondary scrubber chamber is complete.

BRIEF DESCRIPTION OF THE DRAWINGS

To the accomplishment of the aforementioned and to such further objects as may hereinafter appear, the present invention relates to a waste material incinerator system substantially as defined in the appended claims and as described in the followed specification as considered with the accompanying drawing in which:

DETAILED DESCRIPTION OF THE INVENTION

Figure 1:
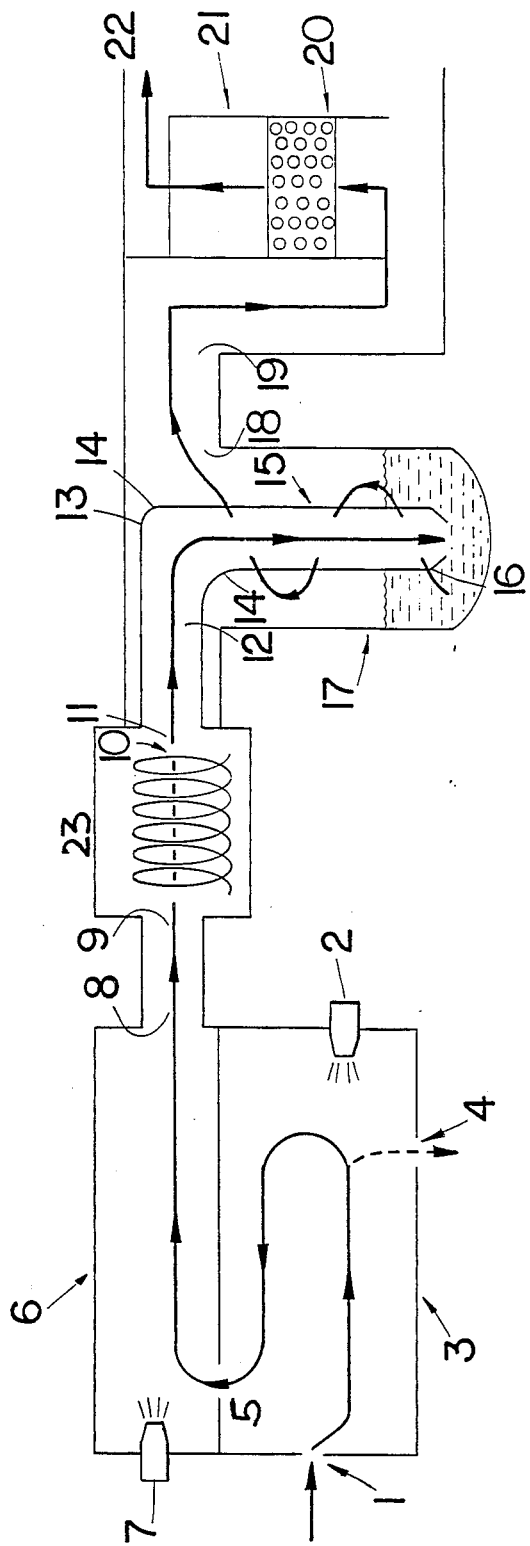
FIG. 1 is a schematic of the inventive incineration system.

In practicing the present invention, as illustrated in FIG. 1, solid or liquid forms of contaminated waste material are fed into an open end (1) of a first combustion or rotary furnace chamber (3), which is held in a horizontal, slightly inclined position. On the end of rotary furnace chamber (3) opposite open end (1), a flame or burner (2) is arranged so as to give a counter-current incineration of the feed material within combustion chamber (3). The counter-current incineration permits the lighter combustion products to pass to the upper portions of combustion chamber (3) whereas the heavier combustion products remain at the bottom of chamber (3). In this way, less waste materials travel through the system.

The heavier solid residue from this combustion event is removed at an opening (4) in rotary furnace chamber (3) whereas partially combusted fine solids and vaporous materials are carried in a gas stream in a tangential direction into a second combustion chamber (6). These particulate solids and vaporous materials pass from first combustion chamber (3) into second combustion chamber (6) through open end (5). Another flame or burner (7) arranged at the opposite end of second chamber (6) provides a co-current horizontal mode of combustion leading to a full incineration of the particulate and gaseous matter. The tangential approach into second combustion chamber (6) imparts a spinning motion to the gas stream carrying the combusted fine solids and vaporous materials. Thus, there is an increase in residence time within second chamber (6) without the depositing of particulate waste material in chamber (6).

The pressures and temperatures utilized in first combustion chamber (3) and second combustion chamber (6) are not critical. Generally, the temperature will be within the range of about 1400°-1600° F. and the pressure will be within the range of about 1-2 lbs. A temperature of about 1500° F. and a pressure of about 1 lb. atmosphere are generally preferred.

Generally, the oxygen source in first combustion chamber (3) and second combustion chamber (6) will be air.

The off-gases emanating from second chamber (6) exit open end (8) of second combustion chamber (6) and enter a compartment (23) containing a system of cold water-circulating coils (10) through open end (9). The off-gases are first passed horizontally over cold water-circulating coils (10). The temperature of the gases is thereby lowered to about 1000° F. resulting in a reduction of the volume of the gases before introduction into a primary scrubber (17). At the entrance (12) of primary scrubber (17), the cooled gases are subjected to a spray of atomized water (13) to further cool the gases and to remove any remaining heavy particulate matter. The gases are then directed by deflectors (14) down a Venturi tube (15) into a water bath (16) located at the lower end of primary scrubber compartment (17). The deflectors (14) are positioned at the end of Venturi tube (14).

Due to the initial severe angle of deflection of at least 135° from the horizontal, the gases assume a tortuous path through Venturi tube (15), and repeatedly hit the scrubbing surface. The gases then enter water bath (16) in a direction and velocity so as to produce a brisk stirring action or turbulence. Advantageously, this action is produced entirely by the change of direction of the air flow and does not require any moving mechanical parts. The pH of the resulting solution can be easily controlled by introducing suitable acids or bases into water bath (16). Generally, the pH of the resulting solution is within the range 6.5-8.5.

In the continuation of treatment, the gases or vapors released from water bath (16) pass from primary scrubber (17) to secondary scrubber (20). In one embodiment of the invention, secondary scrubber (20) may be a column packed with solids in which the solids in the column bed are coated with a film of continuously running water introduced through an aperature (21). The packing material consists of plastic irregular-shaped pieces which cannot nest or compact. This stage is to remove any aerosol bubbles produced by the turbulence in the preceding scrubbing stage. It also serves to remove any residual materials not cleaned by the previous treatment. Finally, the cleaned gases are exhausted through a chimney (22) into the atmosphere without danger or contamination.

Control of the combustion process which is essential to "clean" burning is achieved in the present invention by a reliable process in which gas temperatures are measured and controlled automatically via a microcomputer-directed feedback system that operates the air intake control valves at the location of first combustion chamber (3). Thus both incineration chambers (3) and (6) can be run at pre-determined and continually maintained temperatures. More specifically, the microcomputer feedback system is a continuous monitoring system comprising a sampling probe, a heat gas transport line, sampling pumps, an oxygen $O_2$ and carbon monoxide CO analyzer, a manually calibrated analyzer system and a data recorder. Once the combustion conditions such as temperature and pressure ranges are established, the microcomputer feedback system will monitor the operation of the incineration system under the desired treatment conditions. If operation conditions deviate from the predetermined ranges, a fail safe will be initiated.

A further aspect of the invention is the facility to remove particulate and gaseous incineration products by introducing chemicals to inactivate or bind the water soluble hazardous materials in primary scrubber system (17). Specifically, the inventive system permits the use of very reactive compounds in primary scrubber stage (17) followed by water or less reactive materials in secondary scrubber (10). Examples of these facilities are: sodium hydroxide solution present in both scrubbers to remove the hydrogen chloride produced by combustion of chlorinated hydrocarbons; and hydrazine or sodium borohydride in the first scrubber stage to chemically reduce to metal those metal oxides which are the incineration by-products from heavy metal contaminated sludges.

The present invention provides a further advantage in that the inventive incineration system can be transported to any desired location. The incineration system of the present invention is comprised of first combustion chamber (3), second combustion chamber (6) in communication with first combustion chamber (3), compartment (23) containing a system of cold water circulating coils (10), wherein compartment (23) is in communication with second combustion chamber (6), primary scrubber (17) in communication with compartment (23), and secondary scrubber (20) in communication with primary scrubber (17). The chambers and parts comprising the incineration system can either be transported as a unit or be assembled at the site of hazardous waste. In this way, hazardous materials can be treated and disposed of at the site of their production, thus eliminating the need for costly and dangerous transportation of such materials.

It will be appreciated that the waste incinerator system of the present invention as described hereinabove meets the objects sets forth in that it is mobile and allows for the treatment of hazardous waste at the site of production. It will also be appreciated that modifications can be made in the embodiment of the invention described without departing from the spirit and scope of the invention.

What is claimed is:

1. A process for treating hazardous waste by incineration comprising the steps of:
   (a) incinerating hazardous waste materials in a first and then in a second combustion chamber to produce a heavy solid residue, fine solids and vaporous by-products of combustion;
   (b) cooling the vaporous by-products of combustion;
   (c) cleaning the vaporous by-products so cooled by passing the cooled vaporous by-products through an atomized water spray and then deflecting the vaporous by-products through a Venturi tube causing the vaporous by-products to assume a tortuous path for passage through a water bath, repeatedly hitting the scrubbing surfaces of said bath, and release for entry into a secondary scrubber chamber; and
   (d) releasing the vaporous by-products so cleaned into the atmosphere.

2. The method of claim 1, further comprising the step of moving the hazardous waste materials through said first combustion chamber in a counter-current direction to the hazardous waste entering said first combustion chamber.

3. The method of claim 1, further comprising the step of moving the hazardous waste materials through said second combustion chamber in a co-current direction with the hazardous waste entering said second combustion chamber.

4. The process of claim 1, further comprising the step of discarding the heavy solid residue so produced from said first combustion chamber and introducing the fine solids and vaporous by-products into said second combustion chamber.

5. The method of claim 4, further comprising the step of fully incinerating the fine solids and vaporous by-products in said second combustion chamber to produce off-gases.

6. The method of claim 5, further comprising the step of removing the off-gases from said second combustion chamber and passing the off-gases so removed over a system of cold water circulating coils so as to lower the temperature of the off-gases to at least about 1000° F. to produce cooled gases.

7. The method of claim 1, further comprising the step of introducing a chemical agent into said water bath to control the pH of said water bath.

8. The method of claim 7, the pH of said water bath being within the range 6.5–8.5.

9. The method of claim 7, the chemical agent being selected from the group consisting of sodium hydroxide, hydrazine and sodium borohydride.

10. The method of claim 1, said secondary scrubber chamber being packed with plastic irregular shaped pieces which are coated with a film of flowing water.

11. The method of claim 1, further comprising the step of controlling the incineration in said first and second combustion chambers by a temperature probe and a computer feed back system.

12. A process for treating hazardous waste by incineration comprising:
   (a) incinerating the hazardous waste in a first combustion chamber to produce a heavy solid residue, fine solids and vaporous by-products of combustion;
   (b) discarding the heavy solid residue so produced from said first combustion chamber and introducing the fine solids and vaporous by-products into a second combustion chamber;
   (c) fully incinerating the fine solids and vaporous by-products in said second combustion chamber to produce off-gases;
   (d) removing the off-gases from said second combustion chamber and passing the gases over a system of cold water circulating coils so as to lower the temperature of the off-gases to at least about 1000° F.;
   (e) introducing the cooled gases into a primary scrubber by passing the cooled gases through an atomized water spray;
   (f) deflecting the gases through a Venturi tube to thereby cause the gases to assume a tortuous path for passage through a water bath where the gases repeatedly hit the scrubbing surfaces of said bath;
   (g) passing the gases through the water bath so that they are released into said primary scrubber chamber;
   (h) introducing the released gases from said primary scrubber into a secondary scrubber;
   (i) passing the gases through said secondary scrubber so as to remove any aerosol bubbles and remove any residual materials; and
   (j) exhausting the cleaned gases.

13. The method of claim 12, further comprising the step of moving the hazardous waste through said first combustion chamber in a counter-current direction to the hazardous waste entering said first combustion chamber.

14. The method of claim 12, further comprising the step of moving the hazardous waste through said second combustion chamber in a co-current direction with the hazardous waste entering said second combustion chamber.

15. The method of claim 12, further comprising the step of introducing a chemical agent into said water bath to control the pH of said water bath.

16. The method of claim 15, the pH of said water bath being within the range 6.5–8.5.

17. The method of claim 15, the chemical agent being selected from the group consisting of sodium hydroxide, hydrazine and sodium borohydride.

18. The method of claim 12, said secondary scrubber chamber being packed with plastic irregular shaped pieces which are coated with a film of flowing water.

19. The method of claim 12, further comprising the step of controlling the incineration in said first and second combustion chambers by a temperature probe and a computer feed back system.

20. An apparatus for treating hazardous waste materials comprising (a) a first combustion chamber; (b) a second combustion chamber in communication with said first combustion chamber; (c) a compartment containing a system of cold water circulating coils, said compartment being in communication with said second combustion chamber; (d) a primary scrubber in communication with said compartment, said primary scrubber comprising a Venturi tube; and (e) a secondary scrubber in communication with said primary scrubber.

21. The apparatus of claim 20, said primary scrubber further comprising an atomized water spray positioned at the entrance to said primary scrubber and above said Venturi tube.

22. The apparatus of claim 21, said primary scrubber further comprising means for deflecting gases down said Venturi tube whose top portion is connected with said deflecting means.

23. The apparatus of claim 22, said primary scrubber further comprising a water bath located at the lower end of said primary scrubber.

24. The apparatus of claim 20, said first combustion chamber comprising a rotary furnace in which the hazardous waste materials are incinerated to produce a heavy solid residue, fine solids and vaporous by-products of combustion.

25. The apparatus of claim 21, said rotary furnace comprising a first open end through which the hazardous waste materials are introduced into said rotary furnace, a second open end through which the heavy solid residue so produced is discarded, a third open end through which the fine solids and vaporous by-products pass from said first combustion chamber into said second combustion chamber and a first burner opposite said first open end.

26. The apparatus of claim 25, said first burner being arranged within said rotary furnace so as to move the waste materials through said first combustion chamber in a counter-current direction to the hazardous waste materials entering said first combustion chamber.

27. The apparatus of claim 25, said second combustion chamber comprising said third open end through which the fine solid and vaporous materials pass from said first combustion chamber into said second combustion chamber to be fully incinerated to produce off gases, a fourth open end through which the off-gases so produced are removed from said second combustion chamber to be passed over said system of cold water circulating coils and a second burner.

28. The apparatus of claim 27, said second burner being arranged within said second combustion chamber so as to move the hazardous waste materials through said second combustion chamber in a co-current direction with the hazardous waste materials entering said second combustion chamber.

29. The apparatus of claim 20, said secondary scrubber comprising a column packed with solids that are coated with a film of continuously running water.

30. The apparatus of claim 29, said solids consisting of irregular shaped pieces of plastic.

31. An apparatus for treating hazardous waste materials comprising a scrubber chamber containing a water bath at the bottom of said chamber, an inlet for receiving off-gases from a combustion system positioned at the top of said chamber, a water spray positioned substantially about said inlet, deflecting means positioned so as to deflect the off-gases entering through said inlet in a tortuous path through a Venturi tube causing the gas to repeatedly hit the scrubbing surfaces of said bath, said Venturi tube whose top portion is connected with said deflecting means and whose bottom portion is immersed in said water bath, and an outlet for the off-gases so cleaned positioned substantially above said water bath.

* * * * *